UNITED STATES PATENT OFFICE.

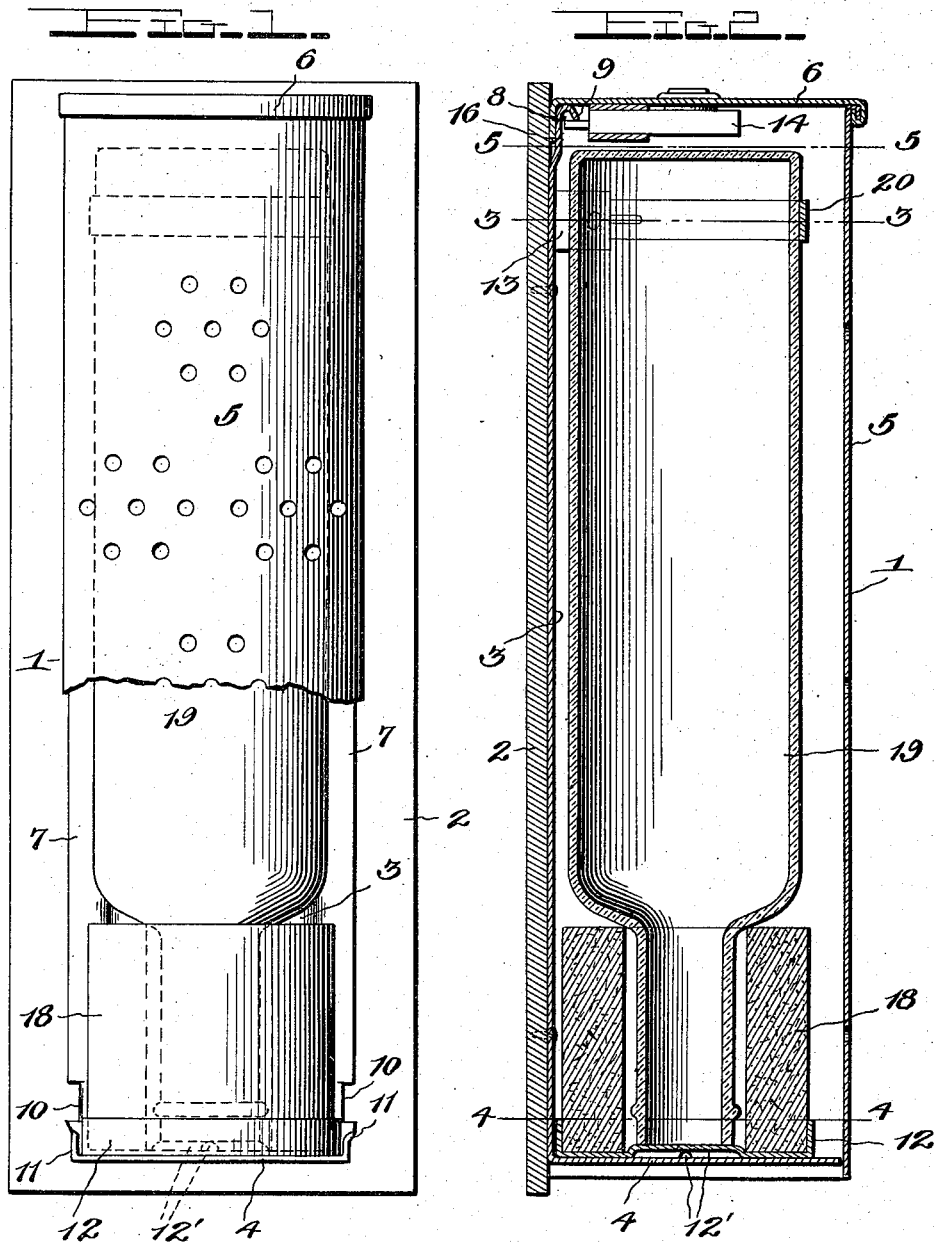

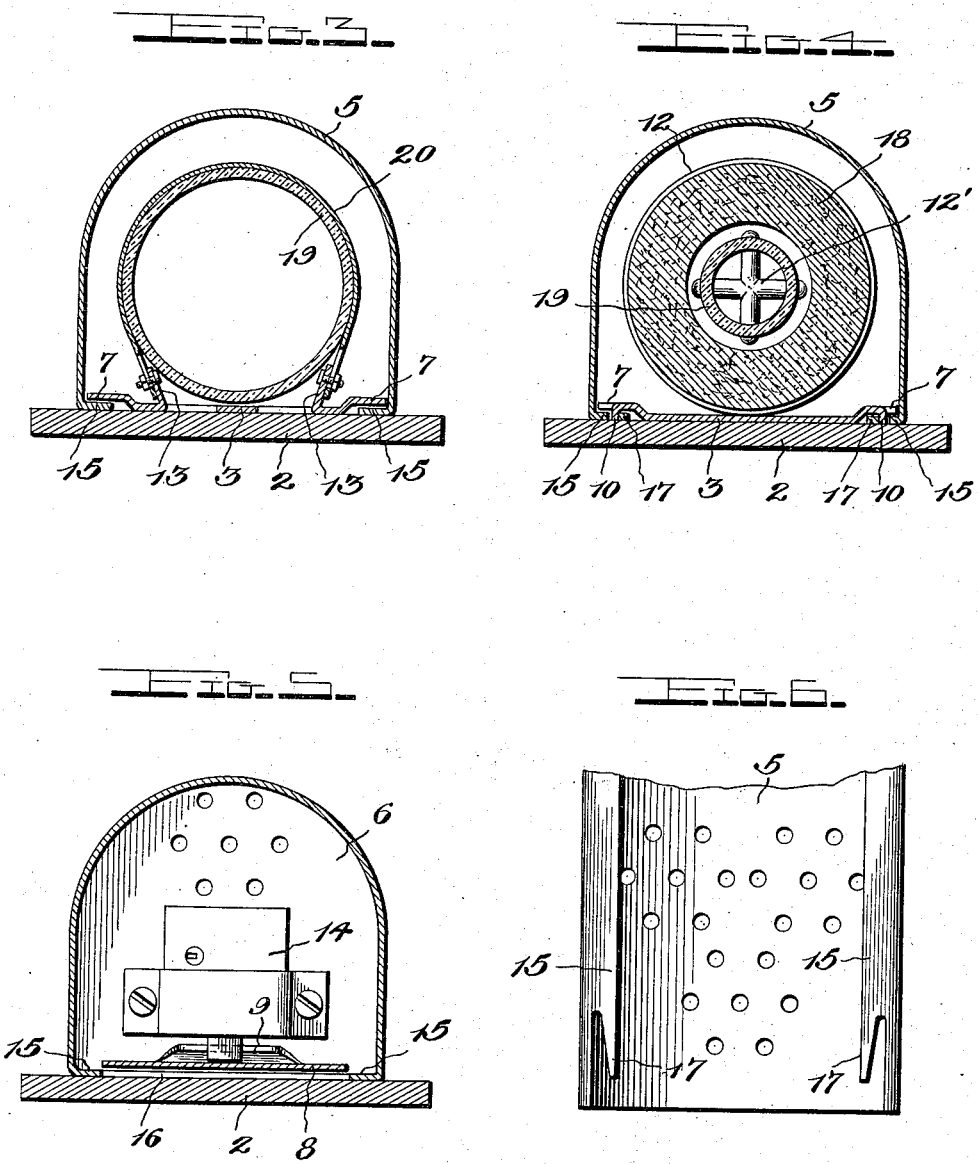

GEORGE F. CHAPMAN, OF NATICK, MASSACHUSETTS.

SELF-FEEDING DISINFECTING AND DEODORIZING DEVICE.

1,156,974.  Specification of Letters Patent.  Patented Oct. 19, 1915.

Application filed December 5, 1913. Serial No. 804,849.

*To all whom it may concern:*

Be it known that I, GEORGE F. CHAPMAN, a citizen of the United States, residing at Natick, in the county of Middlesex and State of Massachusetts, have invented certain new and useful Improvements in Self-Feeding Disinfecting and Deodorizing Devices, of which the following is a specification.

This invention relates to improvements in self-feeding disinfecting and deodorizing devices, and it consists essentially in the construction, arrangement, and combination of the several parts of the device, as will be hereinafter fully described, and briefly set forth in the claim.

The principal objects of the invention are to provide a reliable and economical self-feeding, disinfecting and deodorizing device, and a cage or casing for holding the same to prevent it being intentionally, or otherwise, removed from its support.

Other objects of the invention will become apparent in the detail description of the device.

In the drawings—Figure 1 is a front elevation of my improved self-feeding disinfecting and deodorizing device, secured to a suitable support, and having the lower portion of the sliding hood or cover broken away. Fig. 2 is a vertical longitudinal central section of the device, showing the sliding hood or cover in position, and locked, and the disinfectant holder and gas-generator in position. Fig. 3 is a horizontal cross-section, taken on the line 3—3 Fig. 2. Fig. 4 is a similar view taken on the line 4—4 Fig. 2. Fig. 5 is a horizontal cross-section, looking upward, taken on line 5—5 Fig. 2, and Fig. 6 is a detail view, enlarged, of the bottom portion of the hood or cover, looking from the rear thereof.

Referring to the drawings, the numeral 1 indicates the cage or casing of my self-feeding disinfecting and deodorizing device, and 2 a suitable support, to which it is to be secured when placed in position for use. This cage or casing is, preferably made in two parts, 3 and 4, the back and bottom, respectively, and 5 a sliding hood or cover, preferably curved in cross-section, as shown, and provided with a suitable top portion 6, either flat, or of any other approved construction. The back portion 3 and the bottom portion 4 are preferably formed from a single piece of sheet metal by means of suitable dies. The back portion 3 is provided with the flanged, or struck-up, edges 7, 7, as shown in Figs. 1, 3, and 4, and at its top with a flanged, or struck-up, edge 8, the upper portion 9 of said edge 8 being bent over inwardly and downwardly, for a purpose hereinafter stated. Near the lower end of the back 3 the flanges 7, 7, are provided with rearwardly extending projections 10, 10, for a purpose hereinafter set forth, and near the top of this back portion 3, below the flange 8 and between the flanges 7, 7, are suitable inwardly projecting ears or lugs 13, 13, preferably struck-up from said back portion 3, as shown in Figs. 2 and 3. The bottom portion 4 is provided with upturned flanges 11, 11, for the purpose of providing a suitable seat for a removable drip or feeding pan 12. The central portion of the bottom of said pan 12 is provided with a raised or embossed portion 12′, for a purpose hereinafter stated.

The hood or cover of the cage or casing consists of the curved wall 5 and the top portion 6, and to the under side of this top portion 6 is secured a suitable lock 14, adapted, when the hood or cover is in position, to engage the portion 9 of the edge 8, for the purpose of locking said hood or cover against displacement, or removal, and thereby preventing access to the interior of said cage or casing without the key, either for the purpose of removing the contents thereof, or for removing said cage, or casing, from its support. The cage or casing is secured to the support 2 by suitable securing means, preferably screws, or bolts, extending from the inside of the cage or casing, through the back portion 3 into said support, whereby said cage or casing cannot be removed from said support except when said cage or casing is open. The rear portion of said hood or cover is provided with inwardly turned flanges 15, 15, and 16, as shown in Figs. 2, 3, 4, 5, and 6, and near the lower ends of the flanges 15, 15, said flanges are so cut-away as to provide the prongs 17, 17, for a purpose hereinafter stated.

The numeral 18 indicates a tubular shaped vaporizer, of suitable height and thickness, adapted to be seated in the drip or feeding pan 12 around the raised or embossed portion 12′, as shown in Fig. 4. This vaporizer is made from a suitable porous material, preferably unglazed terra cotta.

19 indicates the holder or reservoir for the disinfecting and deodorizing fluid, and is located within said casing above said vaporizer, with the contracted open end thereof setting into the opening in said vaporizer and resting on the embossed or raised portion 12' of the drip or feeding pan 12, as is apparent.

20 indicates an adjustable strap secured to the lugs or ears 13, 13, and is for the purpose of holding the reservoir 19 in proper position, as is evident.

The operation of the device is as follows: The pan 12 being placed in its seat in the bottom portion 4, the vaporizer is set therein, and the reservoir, filled with the fluid, set in proper position over said vaporizer and under said adjustable strap 20, when the lower contracted open end of said reservoir will project through the opening in said vaporizer and rest upon the embossed portion 12' of the pan 12. When thus arranged the fluid will feed down from the reservoir into the feeding pan 12, and be absorbed by the porous vaporizer 18, and passed off therefrom, by evaporation, in the form of vapor, which passes out through suitable openings in the cage or casing into the space to be disinfected or deodorized. When the reservoir is in position the hood or cover is placed over the back portion 3, the flanges 15, 15, sliding downward back of the flanged edges 7, 7, the flange 16 back of the flange 8, and the prongs 17, 17, over the rearwardly extending projections 10, 10, and the bolt of the lock 14 shot beneath the portion 9 of the flange 8, when the device will be locked.

Having thus fully described my invention I claim:—

In a disinfecting device, a casing comprising a back plate having offset side flanges, rearwardly extending projections on said flanges adjacent their lower ends, a bottom plate extending forwardly from said back plate, a hood disposed outwardly of said bottom plate and having inwardly extending side flanges slidably engaging the rear faces of said first named flanges, said last named flanges being cut away adjacent their lower ends to form prongs engaging over said projections for preventing downward movement of said hood, an inwardly extending projection on the top of said back plate, a flanged cover plate seated upon the top edges of said back plate and hood, and means carried by said cover plate and engaging beneath said last named projection.

In testimony whereof I affix my signature in presence of two witnesses.

GEORGE F. CHAPMAN.

Witnesses:
 EDMUND H. TALBOT,
 E. J. BILLINGS.

Copies of this patent may be obtained for five cents each, by addressing the "Commissioner of Patents, Washington, D. C."